Aug. 13, 1968  M. BALKIN ET AL  3,396,979
SHAFT SEALS
Filed June 23, 1965
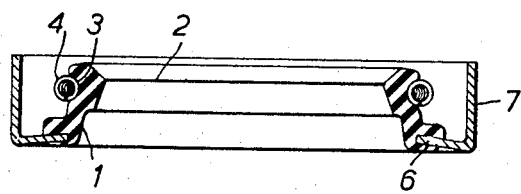

United States Patent Office 3,396,979
Patented Aug. 13, 1968

3,396,979
SHAFT SEALS
Mark Balkin, Denys G. Turner, and Kenneth Irving, Newcastle-upon-Tyne, England, assignors to George Angus & Company Limited, Newcastle-upon-Tyne, England
Filed June 23, 1965, Ser. No. 466,381
Claims priority, application Great Britain, June 30, 1964, 26,978/64
9 Claims. (Cl. 277—153)

ABSTRACT OF THE DISCLOSURE

Lip type shaft seals, and free-flowing vulcanizable rubber compositions for preparing same, are made from vulcanizable rubber compositions which contain: from 75 to 90 parts by weight of butadiene-acrylonitrile rubber which contains 25 to 35% by weight of acrylonitrile; from 10 to 25% parts weight of polyvinyl acetate; from 80 to 110 parts by weight of an inert particulate filler of the type conventionally used in vulcanizable rubber compositions, at least 80% by weight of which has a particle size of greater than 100 millimicrons; and conventional amounts of conventional additives such as plasticizers, accelerators, antioxidant, vulcanizers and the like.

---

This invention relates to shaft seals, also known as "oil seals," which are sealing rings used, around shafts in mechanical apparatus, for preventing fluid leakage and passage of dirt along the shafts.

The invention is concerned with so-called "lip type" shaft seals in which the sealing rings each have a flexible peripheral flange or "lip" which bears resiliently with a wiping contact against a relatively movable surface of a shaft, housing or other part. Often, the flange or lip has a garter spring to increase its wiping contact pressure.

The sealing rings of most lip type shaft seals are moulded from rubber, usually oil-resistant synthetic rubber.

The most suitable rubber material so far used for lip type shaft seals has been a synthetic rubber composition based on butadiene acrylic nitrile copolymer synthetic rubber known as, and hereinafter referred to as, "nitrile rubber." The basic nitrile rubber is, as is well known, compounded with fillers, softeners, vulcanising and other agents or additives, to suit various requirements and forms a plastic composition which is moulded and vulcanised under heat and pressure, to the required shape.

Although shaft seals of nitrile rubber compositions have proved reasonably satisfactory for many years, the requirements for highly efficient and reliable seals in mechanical equipment, for example in motor vehicles and aircraft, under extremes of operating and climatic conditions are becoming more and more exacting and difficult to meet with known nitrile rubber compositions.

A satisfactory composition for the moulding of lip type shaft seals should meet most if not all of the following requirements or conditions:

Mixing and extruding or calendering in preparation of the material in a form for loading or charging into moulding dies.

Bonding to metal inserts, which are frequently used.

Clean and sharp mouldings, without contamination of the dies and with easy discharge therefrom when hot.

Moulding, with consistent mould shrinkage, to precise dimensions.

Mouldings which can be ground or knifed accurately to form the sealing lips or the surfaces or edges thereof.

Mouldings which have a good surface finish, are resistant to abrasion and not liable to abrade the relatively movable surfaces contacted in use.

Mouldings of a given hardness, to seal by wiping contact and retain a spring, when used, and which have flexibility and resilience to maintain wiping contact despite shaft eccentricity.

Mouldings with good high and low thermal resistance, for example from 120° C. to −40° C.

Mouldings with good oil resistance, against both swellings and shrinkage.

Economic manufacture in large quantities.

To provide a composition which meets the optimum of each of the above requirements is very difficult and usually a compromise must be made to balance conflicting requirements and obtain the best practicable all-round result. For example, it is particularly difficult to reconcile maximum oil resistance with good resistance to low temperatures. With nitrile rubbers, it is well known that the higher the acrylonitrile content the better the resistance to oil but the greater the tendency to stiffening at low temperatures. Retention of the flexibility when cold, down to about −40° C., can be obtained only by accepting greater swelling in oil at temperatures of 70° C. to 100° C.

Even when a compromise is reached on the above requirements, there still remains the major need that the seal must be efficient in use. In practice this cannot be predicted because it is still not known what material properties control sealing efficiency. Many theories have been advanced but it is still necessary to test seals of different sizes under service conditions over ranges of temperature, speed and other physical conditions with oils of different chemical composition, viscosity and other properties.

Many apparently suitable compositions fail on test of seals made from them and it becomes necessary to compromise on sealing efficiency. For example, limits of operating temperature range must be accepted or sealing standards have to be relaxed.

In spite of many years of research on shaft seals, the formulation of a suitable moulding composition which will give good seals is still, to a substantial extent, empirical. So much is this the case that users of large quantities of shaft seals use special test equipment and stipulate test acceptance conditions which are becoming more and more severe.

The present invention arises from the concept that the advantages of nitrile rubber compositions might be retained and the difficulties, of their meeting increasingly severe requirements for lip type shaft seals, might be overcome by widening the field of investigation for plastic substances to modify the properties of nitrile rubber composition mouldings, rather than to vary proportions or select from known possible ingredients for previously known nitrile rubber compositions.

In pursuance of this idea, it has been found that the inclusion of polyvinyl acetate, in a nitrile rubber composition for the moulding of lip type shaft seals, gives remarkably satisfactory results and the present invention therefore consists broadly in the inclusion of polyvinyl acetate in a nitrile rubber composition for moulding lip type shaft seals.

More particularly, according to the invention, a composition for moulding lip type shaft seals has the following general formulation, in proportions by weight:

A.—Rubber, containing butadiene acrylonitrile copolymer and of which, preferably, 25 % to 35% is acrylonitrile _____ 75% to 90% } of 100 parts A and B combined
B.—Polyvinyl acetate _ 10% to 25% 
C.—Inert particulate filler.
D.—Vulcanising, plasticising and other agents or additives as required to make up a vulcanisable plastic composition.

The preferred proportions of A, B, C are 80, 20, 110.

The filler constituent C is preferably carbon black, calcium carbonate, or clay, and preferably has a relatively coarse particle size, e.g., at least 80% of the filler has a particle size of not less than 100 milliimicrons.

In the above formulation, the component A may be entirely butadiene acrylonitrile copolymer or this rubber may be diluted or extended by the incorporation of one or more other rubbers, such as natural rubber, butadiene-styrene copolymer, polybutadiene and polyisoprene, provided that the acrylonitrile content of the total rubber is 25% to 35%. The preferred proportion of acrylonitrile is 28%.

The component B need not be simply polyvinyl acetate but may be a blend, mixture or copolymer of polyvinyl acetate and polyvinyl chloride.

Three examples of compositions in accordance with the invention (Examples 1, 2 and 3) will now be given by way of example, and in comparison with three further examples (4, 5 and 6) of compositions lying outside the scope of the invention.

erty which is an important advantage in the actual production of the seals.

This property is that the composition can readily be granulated, i.e., reduced to particulate form, and remains free-flowing without the tendency for the particles to stick together such as is found with previous granulated rubber compositions.

Moreover, in the process of moulding, the particles blend together completely and produce homogeneous mouldings free from the granular structure which has been a defect of previous mouldings from granular compositions.

According to a further feature of the present invention therefore, a method of moulding lip type shaft seals comprises preparing a composition as defined above in accordance with the general or preferred formulation, granulating the composition and moulding the seals from the granulated composition.

By "granulating" is meant reduction of the composition to particulate form, such as by extrusion and cutting, or chopping or mincing.

| Examples | Parts by weight | | | | | |
|---|---|---|---|---|---|---|
| | 1 | 2 | 3 | 4 | 5 | 6 |
| A Butadiene-acrylonitrile copolymer: | | | | | | |
| 28% acrylonitrile | 80 | | 60 | 67 | 67 | 80 |
| 40% acrylonitrile | | 60 | 30 | 33 | 33 | |
| Butadiene-styrene copolymer | | 25 | | | | |
| B Polyvinyl acetate (Vinnapas VW10) | 20 | 15 | 10 | | | 20 |
| C Filler: | | | | | | |
| Carbon Black: | | | | | | |
| Medium thermal | 110 | 110 | 80 | 110 | | |
| High Abrasion Furnace | | | | | 60 | 50 |
| Calcium Carbonate | | | 40 | | | |
| D Additives: | | | | | | |
| Sulphur | 1 | 1 | 1 | 1 | 1 | 1 |
| Zinc Oxide | 5 | 5 | 5 | 5 | 5 | 5 |
| Stearic Acid | 1 | 1 | 1 | 1 | 1 | 1 |
| Antioxidant (phenyl beta naphthylamine) | 2 | 2 | 2 | 2 | 2 | 2 |
| Plasticizer (dioctyl sebacate) | 10 | 10 | 10 | 10 | | 10 |
| Mercaptobenzthiazole | 1.2 | 1.2 | 1.2 | 1.2 | 1.2 | 1.2 |
| Tetramethylthiuram disulphide | 0.4 | 0.4 | 0.4 | 0.4 | 0.4 | 0.4 |
| Vulcanized 20 minutes at 154° C., Hardness BS° | 79 | 76 | 76 | 62 | 76 | 77 |
| Brittle point, °C | −45 | −42 | −43 | −50 | −53 | −51 |
| Oil Resistance, ASTM No. 3 Oil, 70 hrs. at 100° C. Vol. Change, Percent | +9 | +9.5 | +10 | +6 | +17 | +11 |
| Sealing Efficiency | Exc. | Exc. | Exc. | Poor | Poor | Poor |

Example 1 is the preferred composition.

Example 2 is satisfactory, and as component A contains a blend of 40% butadiene-acrylonitrile copolymer with butadiene-styrene copolymer, giving a total acrylonitrile proportion in this component of 28.2%.

Example 3 is also satisfactory and has a total acrylonitrile proportion in component A of 32%, with a proportion in component C of a calcium carbonate filler of a coarse particle size as referred to above.

All these examples exhibit good mixing and moulding properties, bond well to metal, have good surface finish, and adequate resistance to abrasion. As shown by the test results, they have adequate hardness good low temperature and oil resistance, and excellent sealing efficiency.

Examples 4 and 5 contain no polyvinyl acetate and are outside the scope of the invention, and unsatisfactory. Both show poor sealing efficiency and Example 5 swells excessively in the oil resistance test.

Example 6 contains carbon black of the high abrasion furnace type with a fine particle size below 100 millimicrons. Although this compositon is satisfactory in some ways its sealing efficiency is poor.

In the preparation of any particular composition the usual technique for rubber mixes may be followed, the components A and B (P.V.A. solid) first being mixed together and the other ingredients added and thoroughly dispersed in conventional rubber-mixing equipment.

Alternatively, the components A and B may be pre-blended, such as on a two-roll mill or in an internal mixer, or mixed as aqueous dispersions followed by coagulation and drying.

Compositions containing polyvinyl acetate, with or without polyvinyl chloride, in accordance with the invention not only meet the stated requirements for highly efficient lip type shaft seals but they have another prop- The particle size of the granulated composition will depend to some extent on the size of the seals to be moulded, the larger the seal diameter the larger the granular particles which can be used. A practical lower limit of average particle size is probably about 0.5 mm. (millimetre) and an upper limit about 10.0 mm. For seals in the commonest sizes, say up to 3 inches diameter, a particle size range of 1.0 mm. to 3.0 mm. gives good results.

The granulated composition in accordance with the invention may be moulded in various ways. It may be fed or delivered, in measured amounts, to dies or may be preformed into blanks for loading into dies, such as by being pressed, or otherwise cold-formed, into slugs, pellets or intermediate blanks.

If metal-insert shaft seals are to be made, the metal inserts, suitably prepared to bond with the composition, are loaded into the dies with the granulated composition or incorporated with or in the preformed blanks.

One example of a lip type shaft seal manufactured of a composition in accordance with the invention is illustrated in the accompanying drawing which is a sectional view through an oil seal.

In the drawing the nitrile-rubber based sealing element is indicated at 1, with an internal annular sealing lip 2. The element is bonded to an inturned flange 6 of a metal sleeve 7, and the element is formed with an external groove 3 locating a surrounding garter spring 4 to reinforce the inward pressure of the lip 2 against the surface of a shaft passing through the seal. It will be understood that other constructions are possible, and that the seal may be of an external type, with a lip designed to engage the surface of a surrounding hollow part.

We claim:
1. A lip type shaft seal including an annular resilient body having an annular flexible flange with a peripheral sealing lip, said resilient body consisting essentially of a vulcanized rubber composition of:
  (a) about 75 to 90 parts by weight of rubber comprising butadiene-acrylonitrile copolymer, the acrylonitrile content of the rubber being about 25 to 35% by weight;
  (b) about 10 to 25 parts by weight of polyvinyl acetate; and
  (c) about 80 to 110 parts by weight of an inert particulate filler for vulcanized rubber compositions of which at least 80% by weight has a particle size greater than 100 millimicrons.

2. A lip type shaft seal according to claim 1 wherein said inert filler is selected from the group consisting of carbon black, calcium carbonate, clay, and mixtures thereof.

3. A lip type shaft seal according to claim 1 wherein said inert filler comprises carbon black.

4. A lip type shaft seal according to claim 1 further including a metal sleeve bonded to said resilient body.

5. A lip type shaft seal according to claim 1 further including spring means to reinforce pressure of said sealing lip against a shaft sealed thereby.

6. A free-flowing vulcanizable molding composition comprising a plurality of discrete, free-flowing, rubber granules having a particle size of from 0.5 to 10 mm. and consisting essentially of:
  (a) about 75 to 90 parts by weight of rubber comprising butadiene-acrylonitrile copolymer, the acrylonitrile content of the rubber being about 25 to 35% by weight;
  (b) about 10 to 25 parts by weight of polyvinyl acetate; and
  (c) about 80 to 110 parts by weight of an inert particulate filler at least 80% by weight of which has a particle size of not less than 100 millimicrons and being selected from the group consisting of carbon black, calcium carbonate, clay and mixtures thereof.

7. A composition according to claim 6, the granules having a particle size of from 1 to 3 mm.

8. A method of molding shaft seals which include an annular resilient body having an annular flexible flange with a peripheral sealing lip, said process comprising the steps of providing a free-flowing granular vulcanizable rubber composition as claimed in claim 6, and molding the composition under heat and pressure to form said shaft seal.

9. A method according to claim 8 wherein said granules of said vulcanizable composition have a particle size of from 1 to 3 mm.

References Cited
UNITED STATES PATENTS

| | | | |
|---|---|---|---|
| 2,412,216 | 12/1946 | Harvey | 260—887 |
| 2,582,740 | 1/1952 | Ayers | 260—887 |
| 3,223,676 | 12/1965 | Rucker | 260—415 |

ALLAN LIEBERMAN, *Primary Examiner.*